(12) United States Patent
Cha et al.

(10) Patent No.: US 7,468,838 B2
(45) Date of Patent: Dec. 23, 2008

(54) STEREOSCOPIC DISPLAY FOR SWITCHING BETWEEN 2D/3D IMAGES

(75) Inventors: Kyung-hoon Cha, Yongin-si (KR); Serguei Chestak, Suwon-si (KR); Dae-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 237 days.

(21) Appl. No.: 11/270,479

(22) Filed: Nov. 10, 2005

(65) Prior Publication Data

US 2006/0221443 A1 Oct. 5, 2006

(30) Foreign Application Priority Data

Apr. 4, 2005 (KR) .................. 10-2005-0028075

(51) Int. Cl.
*G02B 27/26* (2006.01)
(52) U.S. Cl. .................. 359/465; 348/58; 349/15; 353/8
(58) Field of Classification Search .................. 359/462, 359/464, 465; 348/42, 51, 54, 55, 57, 58; 349/15; 353/7, 8
See application file for complete search history.

(56) References Cited

U.S. PATENT DOCUMENTS

| | | | |
|---|---|---|---|
| 5,825,541 A | 10/1998 | Imai | |
| 6,195,205 B1 | 2/2001 | Faris | |
| 6,377,295 B1 * | 4/2002 | Woodgate et al. | 348/59 |
| 6,384,971 B1 | 5/2002 | Faris | |
| 6,590,605 B1 * | 7/2003 | Eichenlaub | 348/51 |
| 2002/0030888 A1 * | 3/2002 | Kleinberger et al. | 359/465 |
| 2004/0109115 A1 | 6/2004 | Tsai et al. | |
| 2005/0286126 A1 * | 12/2005 | Huang et al. | 359/465 |
| 2006/0114415 A1 * | 6/2006 | Shestak et al. | 353/7 |
| 2006/0227420 A1 * | 10/2006 | Cha et al. | 359/465 |
| 2007/0008619 A1 * | 1/2007 | Cha et al. | 359/462 |

FOREIGN PATENT DOCUMENTS

| | | |
|---|---|---|
| CN | 1506714 A | 6/2004 |
| JP | 7-5325 A | 1/1995 |
| JP | 8-186849 A | 7/1996 |
| JP | 9-43540 A | 2/1997 |
| JP | 10-221644 A | 8/1998 |
| JP | 2002-250895 A | 9/2002 |
| JP | 2004-258631 A | 9/2004 |
| KR | 2000-0075116 A | 12/2000 |
| KR | 10-2004-0008955 A | 1/2004 |
| KR | 10-2004-0077596 A | 9/2004 |

* cited by examiner

*Primary Examiner*—Lee Fineman
(74) *Attorney, Agent, or Firm*—Sughrue Mion, PLLC

(57) ABSTRACT

A stereoscopic display for switching between a 2D image and a 3D image, including a display device displaying an image; and a parallax barrier that transmits incident light in a 2D mode and forms barriers to separate images for a left eye and a right eye in a 3D mode. The parallax barrier unit includes a first polarization plate transmitting light with a first polarization direction; a 2D first polarization grating screen including a first birefringence element and a second birefringence element alternating with each other in a grating pattern; a 2D second polarization grating screen facing the first polarization grating screen and including a third birefringence element and a fourth birefringence element alternating with each other in a grating pattern; and a second polarization plate facing the second polarization grating screen and transmitting only light with a second polarization direction among lights transmitted through the second polarization grating screen.

10 Claims, 6 Drawing Sheets

STEREOSCOPIC DISPLAY FOR SWITCHING BETWEEN 2D/3D IMAGES

CROSS-REFERENCE TO RELATED PATENT APPLICATION

This application claims priority from Korean Patent Application No. 10-2005-0028075, filed on Apr. 4, 2005, in the Korean Intellectual Property Office, the disclosure of which is incorporated herein in its entirety by reference.

BACKGROUND OF THE INVENTION

1. Technical Field

The present invention relates to a stereoscopic display for switching between a two-dimensional (2D) mode and a three-dimensional (3D) mode, and more particularly, to a stereoscopic display for generating a horizontal parallax or a vertical parallax using two polarization grating screens.

2. Related Art

A related art three-dimensional (3D) image is produced by combining two images separately captured by the left eye and the right eye. Because the human eyes are separated by about 65 mm from each other, the images of an object sensed by the respective eyes are slightly different. This difference is called binocular parallax and is the most important factor in producing a 3-D effect. Recent related art demands for stereoscopic displays that provide a stereoscopic image using binocular parallax have greatly increased in various fields, such as medical applications, games, advertisement, education applications, and military training. With the development of high resolution televisions, stereo televisions for providing a stereoscopic image are expected to be widely used in the future.

Related art stereoscopic displays are divided into displays using glasses (e.g., viewing glasses worn by a user) and glassless displays. In general, as shown in FIG. 1A, a related art stereoscopic display using glasses includes a liquid crystal display (LCD) 100 displaying an image with a predetermined polarization component, a micro polarizing screen 110 changing the polarization direction according to an image for a left eye and an image for a right eye of the LCD 100, and polarization glasses 120 transmitting images with different polarization states for the left eye and the right eye. For example, the micro polarizing screen 110 is a combination of 0° retarders 110a and 90° retarders 110b that are alternately interspersed. Also, the polarization glasses 120 include a pair of polarization plates 120a and 120b, through which light with different polarization states are transmitted. Since the micro polarizing screen 110 makes the polarization directions of the left-eye image and the right-eye image different from each other, and the polarization glasses 120 separately transmit the left-eye image and the right-eye image, a viewer wearing the polarization glasses 120 can see a 3D image.

However, the related art stereoscopic display has a disadvantage in that the viewer must wear the polarization glasses 120 to see a 3D image. In response, a glassless related art stereoscopic display has been developed. The glassless stereoscopic display obtains a 3D image by separating an image for a left eye from an image for a right eye. In general, related art glassless stereoscopic displays are divided into parallax barrier displays and lenticular displays. In the related art parallax barrier display, images to be seen by the left and right eyes are displayed in an alternate vertical pattern, and the pattern is seen using a very thin vertical lattice (i.e., a barrier). By doing so, a vertical pattern image to be seen by the left eye and a vertical pattern image to be seen by the right eye are separated by the barrier. As a result, the left and right eyes see images from different viewpoints so as to see a 3D image.

According to the parallax barrier display, as shown in FIG. 1B, a parallax barrier 50 including apertures 55 and masks 57 formed in a vertical grating pattern is disposed in front of an LCD panel 53 that has left-eye image information L and right-eye image information R respectively corresponding to a viewer's left eye LE and right eye RE. Each eye sees a different image through the apertures 55 of the parallax barrier 50. The left-eye image information L to be input to the left eye and the right-eye image information R to be input to the right eye are alternately formed in a horizontal direction in the LCD panel 53. If the parallax barrier 50 is disposed in a horizontal direction as well as a vertical direction, both the horizontal parallax and vertical parallax can be created, thereby providing a better stereoscopic image.

Meanwhile, to provide either a 2D image or a 3D image according to an image signal displayed on a display device, the related art glassless stereoscopic display is required to switch between a 2D mode and a 3D mode. To this end, a variety of switchable related art stereoscopic displays have been developed. For example, according to the stereoscopic display disclosed in U.S. Patent Application Publication No. 2004-0109115, two micro retarders including a plurality of vertical stripes are relatively moved to provide a 2D image or a 3D image. However, the stereoscopic display disclosed in U.S. Patent Publication No. 2004-0109115 provides a 3D image using only horizontal parallax, resulting in a limitation to obtain a better 3D image.

SUMMARY OF THE INVENTION

The present invention provides a stereoscopic display which can switch between a 2D mode and a 3D mode and generate both horizontal parallax and vertical parallax when providing a 3D image.

According to an aspect of the present invention, there is provided a stereoscopic display for switching between a 2D image and a 3D image, the stereoscopic display comprising: a display device displaying an image; and a parallax barrier unit that transmits all incident light in a 2D mode and forms barriers to separate an image for a left eye from an image for a right eye in a 3D mode, wherein the parallax barrier unit comprises: a first polarization plate transmitting light with a first polarization direction; a first polarization grating screen including a first birefringence element that changes the polarization direction of light transmitted through the first polarization plate into a first direction and a second birefringence element that changes the polarization direction of light transmitted through the first polarization plate into a second direction opposite to the first direction, the first birefringence element and the second birefringence element alternating with each other in a grating pattern; a second polarization grating screen facing the first polarization grating screen and including a third birefringence element that changes the polarization direction of light transmitted through the first polarization grating screen into the first direction and a forth birefringence element changing the polarization direction of light transmitted through the first polarization grating screen into the second direction opposite to the first direction, the third birefringence element and the fourth birefringence element alternating with each other in a grating pattern; and a second polarization plate facing the second polarization grating screen and transmitting only light with a second polarization direction, among lights transmitted through the second polarization grating screen.

At least one of the first polarization grating screen and the second polarization grating screen may be moved such that a 2D image and a 3D image can be selectively displayed according to the relative positions of the first and second polarization grating screens.

At least one of the first polarization grating screen and the second polarization grating screen may be horizontally moved such that vertical barriers for a 3D image are formed to generate horizontal parallax. At least one of the first polarization grating screen and the second polarization grating screen may be vertically moved such that horizontal barriers for a 3D image are formed to generate vertical parallax. At least one of the first polarization grating screen and the second polarization grating screen may be moved horizontally and vertically at the same time such that vertical barriers for a 3D image are formed to generate horizontal parallax and horizontal barriers for a 3D image are formed to generate vertical parallax.

One of the first and second birefringence elements may be a rotator rotating incident light by an angle of about 45° and the other one of the first and second birefringence elements may be a rotator rotating incident light by an angle of about −45°. One of the third and fourth birefringence elements may be a rotator rotating incident light by an angle of about 45° and the other one of the third and fourth birefringence elements may be a rotator rotating incident light by an angle of about −45°.

One of the first and second birefringence elements may be a retarder phase-delaying incident light by about $\lambda/4$ and the other one of the first and second birefringence elements may be a retarder phase-delaying incident light by about $-\lambda/4$. One of the third and fourth birefringence elements may be a retarder phase-delaying incident light by about $\lambda/4$ and the other one of the third and fourth birefringence elements may be a retarder phase-delaying incident light by about $-\lambda/4$.

The first polarization plate and the second polarization plate may be formed so that their polarization directions can be substantially parallel or perpendicular to each other.

The display device may include a plurality of 2D pixels that emit light independently, and the parallax barrier unit may be disposed between the display device and a viewer. The display device may be a plasma display panel.

The display device may comprise: a backlight unit emitting light; a rear polarization plate transmitting only light with a third polarization direction among lights emitted by the backlight unit; a liquid crystal display panel polarizing incident light per pixel and providing an image; and a front polarization plate transmitting only light with a fourth polarization direction among lights transmitted through the liquid crystal display panel, wherein the parallax barrier unit is disposed between the liquid crystal display panel and a viewer, wherein the front polarization plate of the display device is the first polarization plate of the parallax barrier unit.

The display device may comprise: a backlight unit emitting light; a rear polarization plate transmitting only light with a first polarization direction among lights emitted by the backlight unit; a liquid crystal display panel polarizing incident light per pixel and providing an image; and a front polarization plate transmitting only light with a second polarization direction among lights transmitted through the liquid crystal display panel, wherein the parallax barrier unit is disposed between the backlight unit and the liquid crystal display panel, wherein the rear polarization plate of the display device is the second polarization plate of the parallax barrier unit.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS OF THE INVENTION

The present invention will now be described more fully with reference to the accompanying drawings, in which exemplary embodiments of the invention are shown.

Figure 2A:
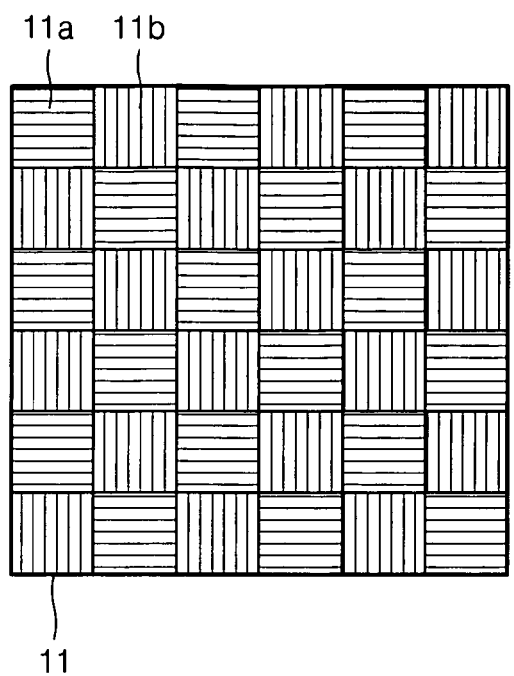
FIGS. 2A and 2B illustrate polarization grating screens according to an exemplary embodiment of the present invention.
Figure 2B:
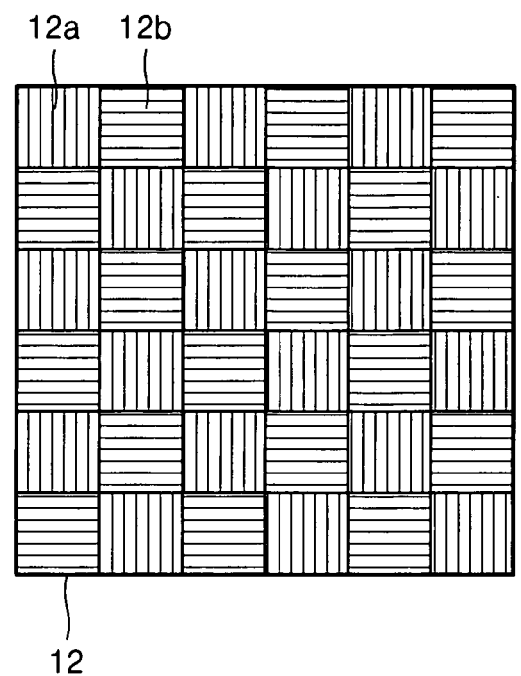

FIGS. 2A and 2B illustrate first and second polarization grating screens according to an exemplary embodiment of the present invention. Each of a first polarization grating screen 11 and a second polarization grating screen 12 may be a combination of birefringence elements (i.e., rotators and retarders). The first polarization grating screen 11 has a two-dimensional (2D) grating pattern such that a plurality of first and second birefringence elements 11a and 11b of a substantially square shape and having a length alternate with each other. Likewise, the second polarization grating screen 12 has a 2D grating pattern such that a plurality of third and fourth birefringence elements 12a and 12b of a substantially square shape and having a length alternate with each other.

For example but not by way of limitation, when the first and second birefringence elements 11a and 11b are rotators (i.e., circular birefringence elements), the first and second birefringence elements 11a and 11b rotate incident light at angles of about +45° and −45°, respectively. Also, when the third and fourth birefringence elements 12a and 12b are rotators, they rotate incident light at angles of about −45° and +45°, respectively.

Alternatively, the first and second birefringence elements 11a and 11b may be retarders that are linear birefringence elements. In this case, the first and second birefringence elements 11a and 11b phase-delay incident light by about +$\lambda/4$ and −$\lambda/4$, respectively, wherein $\lambda$ denotes the wavelength of incident light. Also, when the third and fourth birefringence elements 12a and 12b are retarders, they phase-delay incident light by—about $\lambda/4$ and +$\lambda/4$, respectively. When incident polarized light of a direction is phase-delayed by about +$\lambda/4$ or −$\lambda/4$, the polarization direction of the incident light is changed by about +45° or −45°. Accordingly, regardless of whether the first through fourth birefringence elements 11a, 11b, 12a, and 12b are rotators or retarders, they can change the polarization directions of incident light into specific directions.

Accordingly, a 2D image or a 3D image can be realized by relatively moving the first and second polarization grating screens 11 and 12.

FIGS. 3A through 3D illustrate a schematic view for explaining a method of forming a 2D image using the first and second polarization grating screens 11 and 12 in a stereoscopic display according to an exemplary embodiment of the present invention.

Figure 3A:
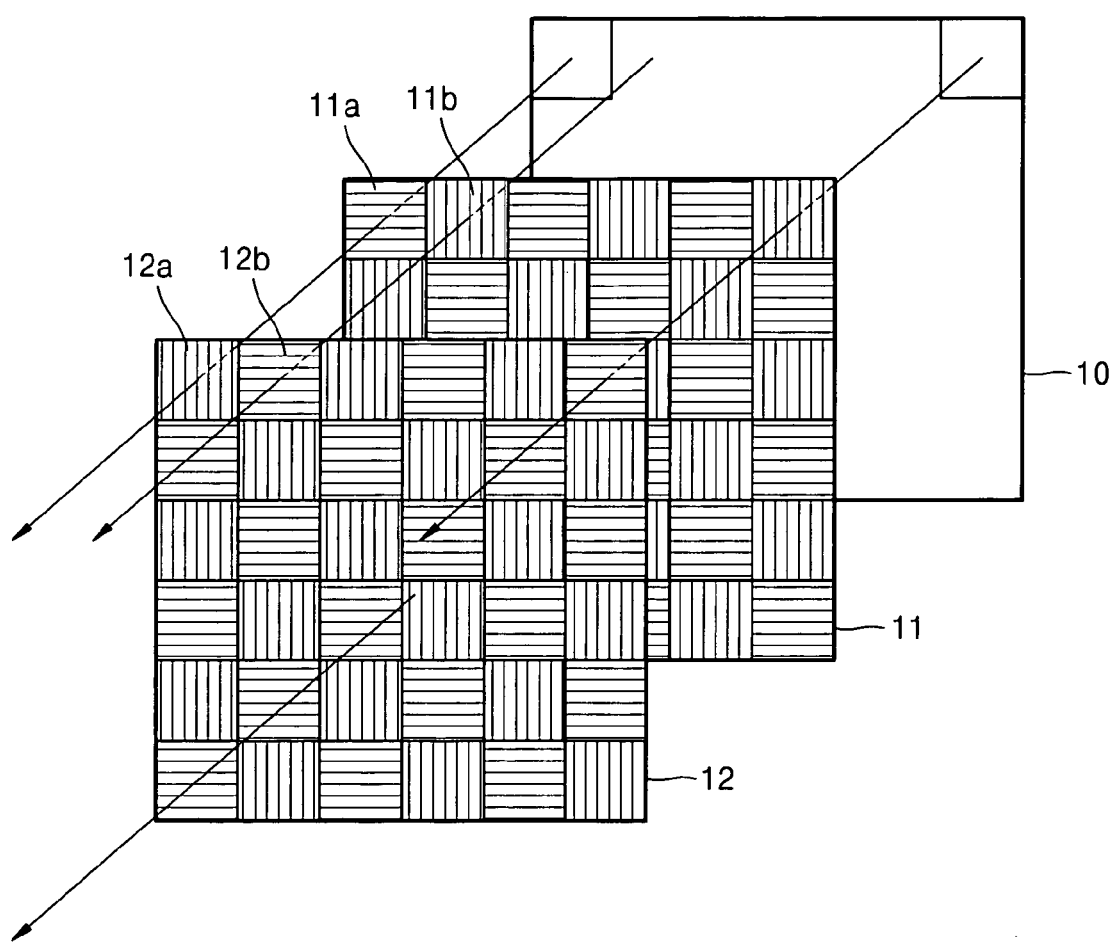
FIGS. 3A through 3D are schematic views for explaining a method of forming a 2D image in a stereoscopic display according to an exemplary embodiment of the present invention.

Referring to FIG. 3A, to produce a 2D image, the first and second polarization grating screens 11 and 12 completely overlap each other, such that the first and second birefringence elements 11a and 11b coincide with the corresponding third and fourth birefringence elements 12a and 12b. As a result, light transmitted through the first birefringence element 11a is incident on the third birefringence element 12a, and light transmitted through the second birefringence element 11b is incident on the fourth birefringence element 12b. If light incident on the first polarization grating screen 11 has a polarization of about 90°, the light transmitted through the first birefringence element 11a is rotated by about +45° to have a polarization of about 135°, and the light transmitted through the second birefringence element 11b is rotated by about −45° to have a polarization of about 45°. Then, the light transmitted through the first birefringence element 11a and incident on the third birefringence element 12a is rotated by about −45° to have a polarization of about 90°. Also, the light transmitted through the second birefringence element 11b and incident on the fourth birefringence element 12b is rotated by about +45° to have a polarization of about 90° as well. Accordingly, when the first and second polarization grating screens 11 and 12 completely overlap each other, lights emitted from the second polarization grating screen 12 have substantially the same polarization.

Figure 3B:
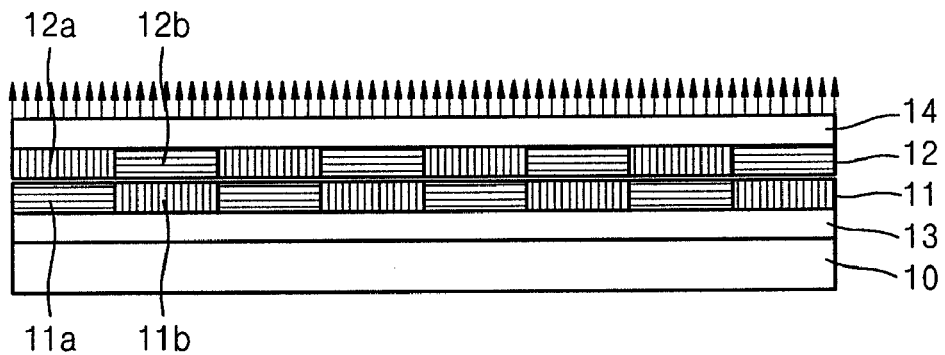

FIG. 3B is a sectional view of the stereoscopic display of FIG. 3A configured to obtain a 2D image. The stereoscopic display includes a display device 10 providing an image, a first polarization plate 13 transmitting only light with a first polarization direction, the first and second polarization grating screens 11 and 12, and a second polarization plate 14 facing the second polarization grating screen and transmitting only light with a second polarization direction among lights transmitted through the second polarization grating screen 12. Here, the first polarization plate 13, the first and second polarization grating screens 11 and 12, and the second polarization plate 14 constitute a parallax barrier unit that transmits all incident light in a 2D mode, and forms barriers to separate images for a left eye and a right eye in a 3D mode. In the 2D mode, as shown in FIG. 3B, the first and second polarization grating screens 11 and 12 completely overlap each other, such that the first and second birefringence elements 11a and 11b of the first polarization grating screen coincide with the respective corresponding third and fourth birefringence elements 12a and 12b of the second polarization grating screen 12.

In this structure, light provided from the display device 10 is first incident on the first polarization plate 13. For example, the first polarization plate 13 may transmit only light with a polarization of about 90° among lights incident from the display device 10. After passing through the first polarization plate 13, part of the light continuously passes through the first birefringence element 11a and the third birefringence element 12a, and the remaining part of the light continuously passes through the second birefringence element 11b and the fourth birefringence element 12b. As described above, all lights emitted from the second polarization grating screen 12 have the same polarization of about 90°. Accordingly, when the first polarization plate 13 that transmits only light with a polarization of about 90° is used as the second polarization plate 14, the image provided from the display device 10 is transmitted to a viewer substantially as it was generated. Accordingly, the display device 10 displays a general 2D image, and the viewer can see the 2D image.

Although, in the exemplary embodiment, the first and second birefringence elements 11a and 11b respectively rotate incident light by about +45° and −45° and the third and fourth birefringence elements 12a and 12b respectively rotate incident light by about −45° and +45°, the first through fourth birefringence elements 11a, 11b, 12a, and 12b may rotate incident light at different angles. For example, the third and fourth birefringence elements 12a and 12b may respectively rotate incident light by about +45° and −45°. In this case, if incident light with a polarization of about 90° continuously passes through the first and third birefringence elements 11a and 12a, the incident light comes to have a polarization of about 180°. If incident light with a polarization of about 90° continuously passes through the second and fourth birefringence elements 11b and 12b, the incident light will have a polarization of about 0°. Therefore, if the first polarization plate 13 transmits only light with a polarization of about 90°, the second polarization plate 14 should be able to transmit light with a polarization of about 0° or 180° substantially perpendicular to the first polarization plate 13.

Meanwhile, the display device 10 may be any kind of display, for example but not by way of limitation, a plasma display panel PDP. As shown in FIG. 3B, the elements 11, 12, 13, and 14 constituting the parallax barrier unit are disposed between the display device 10 and the viewer.

Figure 3C:
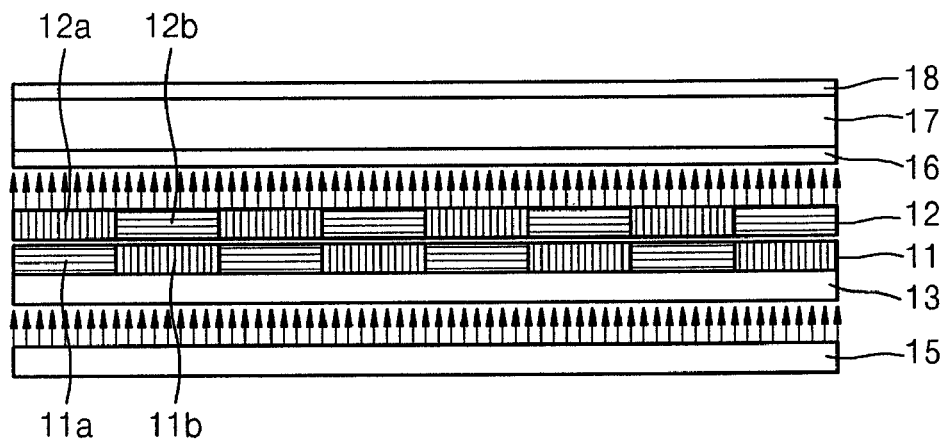
Figure 3D:
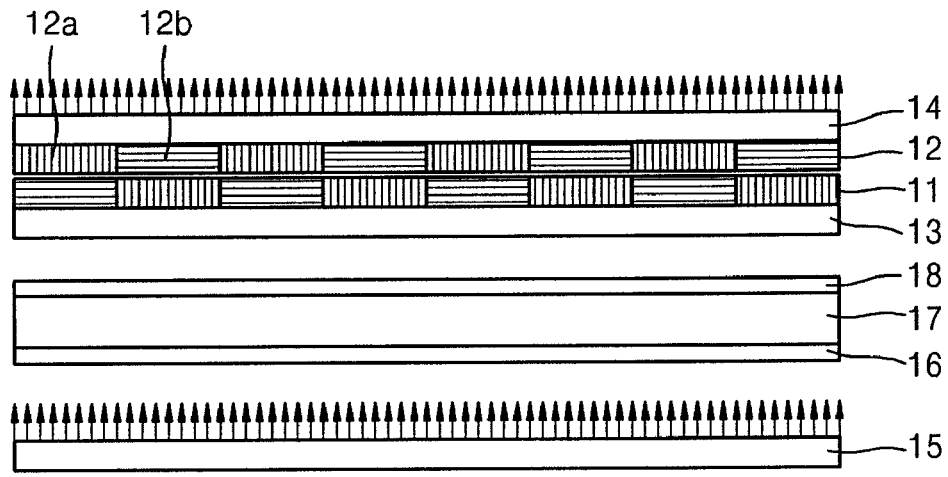

The display device 10 may be a liquid crystal display (LCD) instead of the PDP. The LCD also includes a backlight unit 15 (see FIGS. 3C and 3D) emitting light, a rear polarization plate 16 transmitting only light with a first polarization direction among lights emitted by the backlight unit 15, an LCD panel 17 polarizing incident light per pixel and providing an image, and a front polarization plate 18 transmitting only light with a second polarization direction among lights transmitted through the LCD panel 17. Since the LCD includes the rear and front polarization panels 16 and 18, the front polarization plate 18 of the LCD may be used as the first polarization plate of the parallax barrier unit when the parallax barrier unit is disposed between the viewer and the LCD (see FIG. 3D). In the meantime, as shown in FIG. 3C, the parallax barrier unit may be disposed between the backlight unit 15 and the LCD panel 17 of the LCD. In this case, the rear polarization plate 16 of the LCD may be used as the second polarization plate of the parallax barrier unit.

Figure 4A:
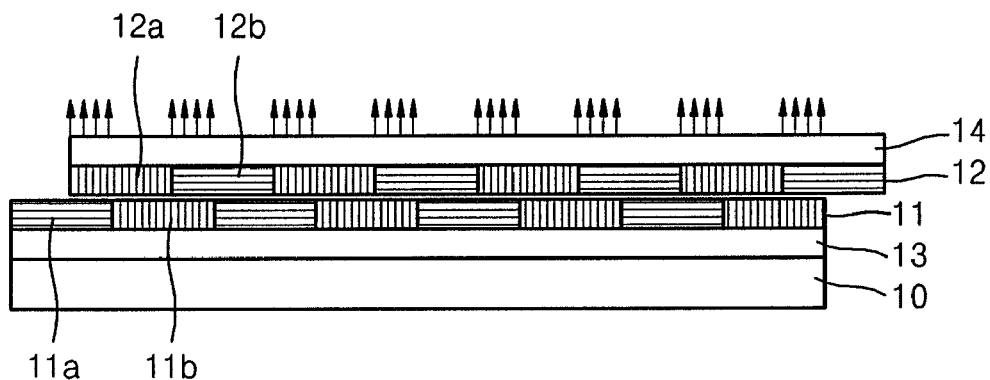
FIGS. 4A through 4C are sectional views for explaining a method of forming a 3D image in the stereoscopic display according to an exemplary embodiment of the present invention.
Figure 4B:
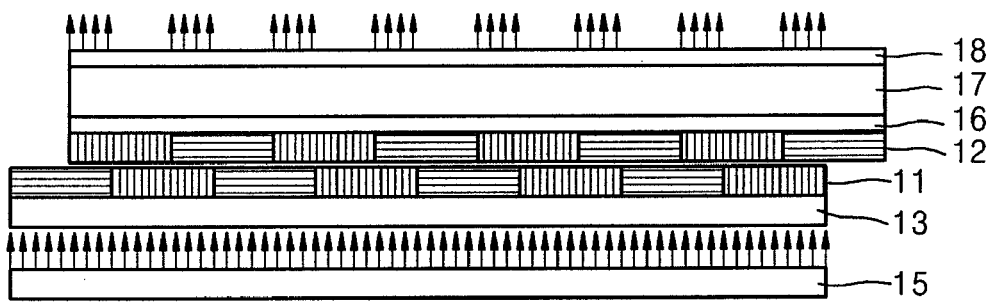
Figure 4C:
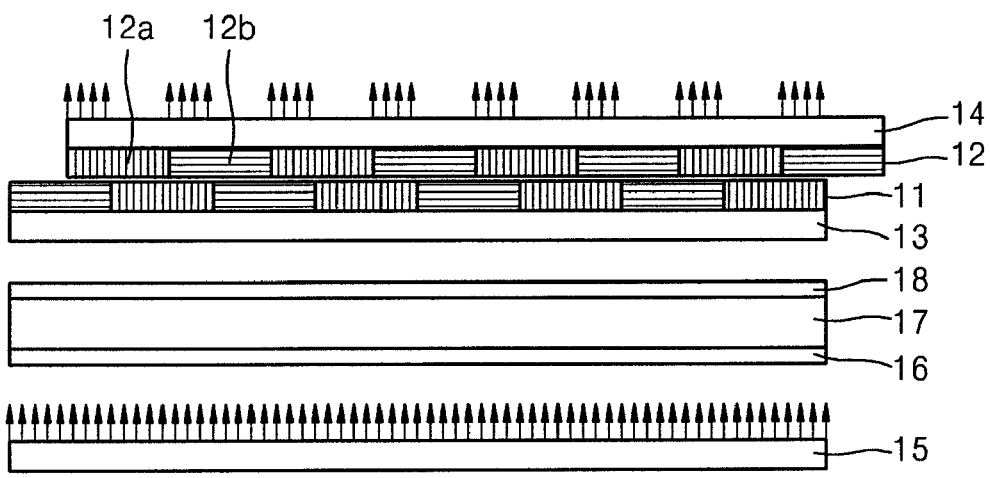

FIGS. 4A through 4C are sectional views for explaining a method of forming a 3D image in the stereoscopic display according to an exemplary embodiment.

To realize a 3D image, the first polarization grating screen 11 and the second polarization grating screen 12 of the parallax barrier unit are relatively moved. Any one of the first polarization grating screen 11 and the second polarization grating screen can be moved vertically or horizontally. Then, as shown in FIG. 4A, the first and second birefringence elements 11a and 11b of the first polarization grating screen 11 and the third and fourth birefringence elements 12a and 12b of the second polarization grating screen 12 are misaligned with respect to each other. Accordingly, part of light transmitted through the first birefringence element 11a is transmitted through the third birefringence element 12a, and the remaining part of the light transmitted through the first birefringence element 11a is transmitted through the fourth birefringence element 12b. Part of light transmitted through the second birefringence element 11b is transmitted through the third birefringence element 12a, and the remaining part of the light is transmitted through the fourth birefringence element 12b.

When the first and second birefringence elements 11a and 11b respectively rotate incident light by about +45° and −45°, the third and fourth birefringence elements 12a and 12b respectively rotate incident light by about −45° and +45°, and the first polarization plate 13 and the second polarization plate 14 transmit only light with a polarization of about 90°, the stereoscopic display operates as follows.

First, light emitted from the display device 10 passes through the first polarization plate 13 to have a polarization of about 90°. Thereafter, part of the light transmitted through the first polarization plate 13 is transmitted through the first birefringence element 11a to have a polarization of about 135°, and the remaining part of the light transmitted through the first polarization plate 13 is transmitted through the second birefringence element 11b to have a polarization of about 45°. Part of the light transmitted through the first birefringence element 11a is transmitted through the third birefringence element 12a to have a polarization of about 90°, and the remaining part of the light transmitted through the first birefringence element 11a is transmitted through the fourth birefringence element 12b to have a polarization of about 180°. Also, part of the light transmitted through the second birefringence element 11b is transmitted through the third birefringence element 12a to have a polarization of about 0°, and the remaining part of the light transmitted through the second birefringence element 11b is transmitted through the fourth birefringence element 12b to have a polarization of about 90°. Since the second polarization plate 14 transmits only light with a polarization of about 90°, only the light continuously transmitted through the first birefringence element 11a and the third birefringence element 12a and the light continuously transmitted through the second birefringence element 11b and the fourth birefringence element 12b can be transmitted through the second polarization plate 14, and the other light is blocked off.

Figure 1A:
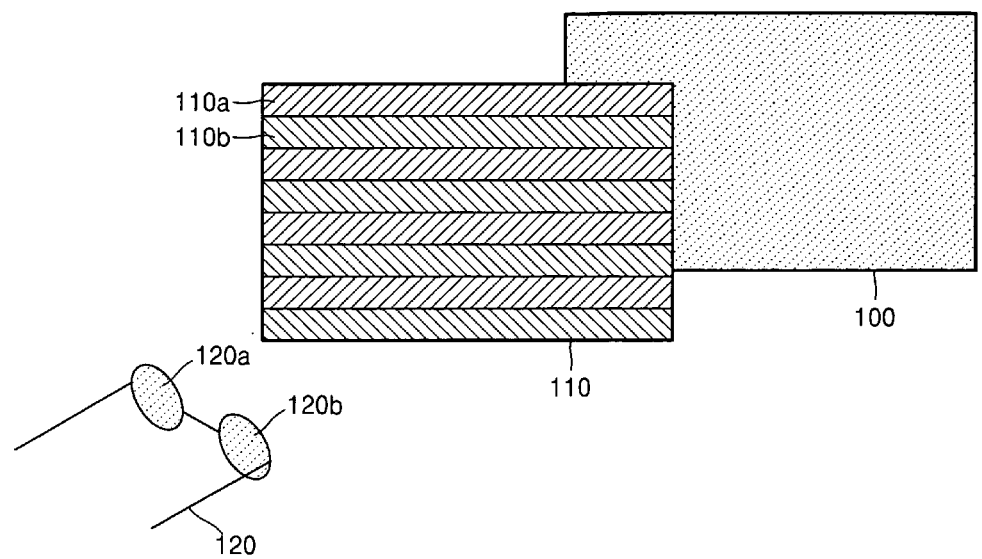
FIG. 1A illustrates a related art stereoscopic display using glasses.
Figure 1B:
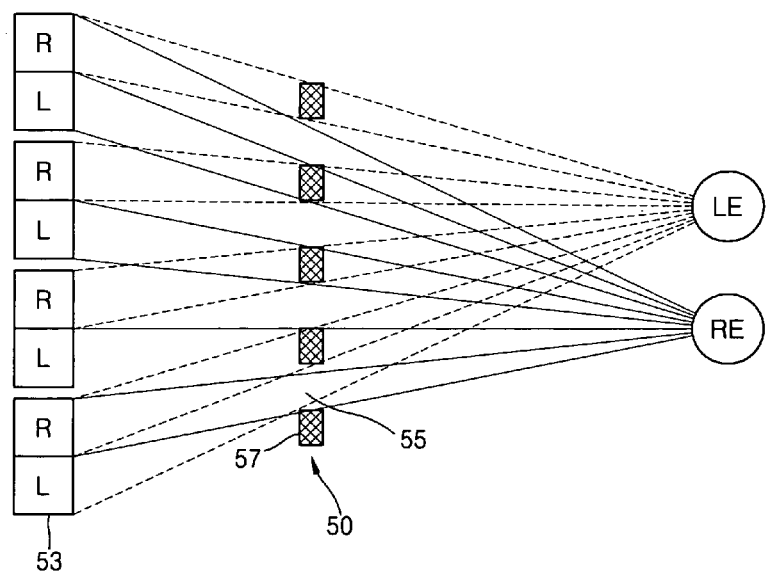
FIG. 1B is schematic view for explaining the principle of a related art parallax barrier stereoscopic display.

As a result, as shown in FIG. 4A, transmission areas through which light can be transmitted and black areas through which light cannot be transmitted alternate with each other. When compared with a general parallax barrier display of FIG. 1B, the transmission areas correspond to apertures, and the black areas correspond to parallax barriers. Accordingly, an image for the viewer's left eye and an image for the viewer's right eye can be separated by the parallax barrier unit. Since binocular parallax occurs by doing so, a stereoscopic 3D image can be obtained.

As described above, the display device 10 may be a PDP or an LCD. Referring to FIGS. 4B and 4C, similar to FIGS. 3C and 3D, the display device 10 is an LCD, and a parallax barrier unit for generating parallax barriers is disposed between the backlight unit 15 and the LCD panel 17. As described above, the rear polarization plate 16 of the LCD can be used as the second polarization plate of the parallax barrier unit.

Figure 4D:
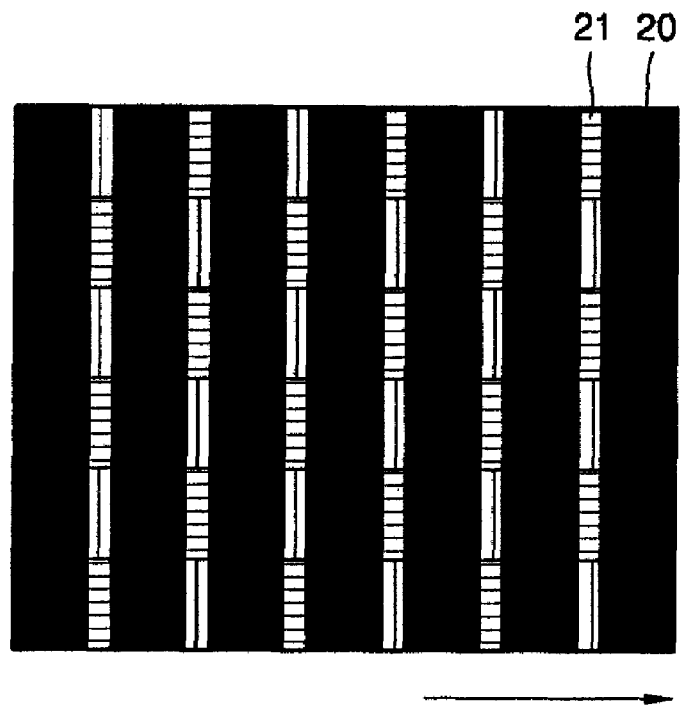
FIG. 4D is a front view of a horizontal parallax barrier pattern made by horizontally moving two polarization grating screens.
Figure 4E:
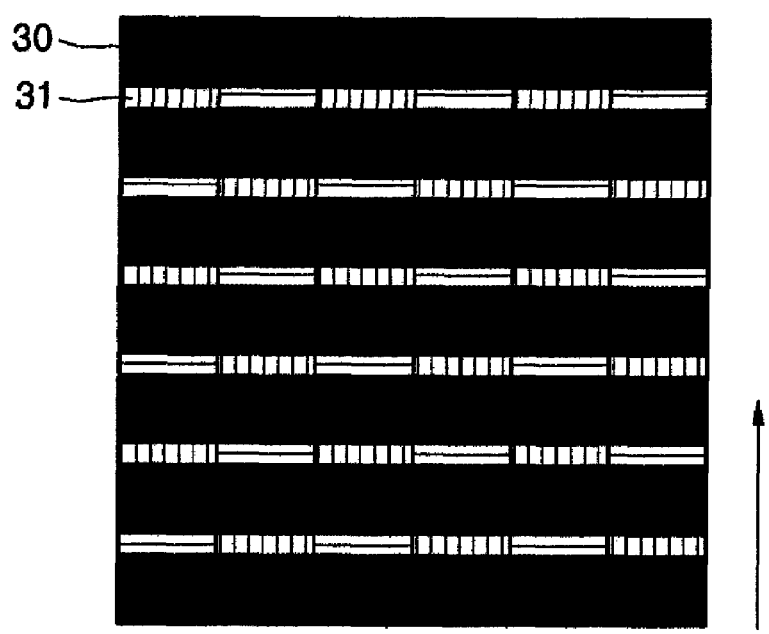
FIG. 4E is a front view of a vertical parallax barrier pattern made by vertically moving two polarization grating screens.

Since the first and second polarization grating screens 11 and 12 are formed by arranging the substantially square birefringence elements in 2D grating patterns, parallax barrier can be created by moving the first and second polarization grating screens 11 and 12 horizontally or vertically. FIG. 4D is a front view of a horizontal parallax pattern made by horizontally moving two polarization grating screens. Referring to FIG. 4D vertical parallax barriers 20 and apertures 21 alternate with each other in a horizontal direction to generate horizontal parallax. Accordingly, the viewer can see a horizontal stereoscopic image. FIG. 4E is a front view of a parallax pattern made by vertically moving two polarization grating screens. Referring to FIG. 4E, horizontal parallax barriers 30 and apertures 31 alternate with each other in a vertical direction to create vertical parallax. Accordingly, the viewer can see a vertical stereoscopic image. Also, when the first and second polarization grating screens 11 and 12 are horizontally and vertically moved at the same time by a distance, both vertical parallax barriers and horizontal parallax barriers are substantially simultaneously formed. Accordingly, vertical parallax as well as horizontal parallax can be created, thereby providing a better stereoscopic image.

As described above, the stereoscopic display according to the exemplary embodiment can easily switch between a 2D mode and a 3D mode using two polarization grating screens. In particular, since both horizontal parallax and vertical parallax can occur substantially simultaneously in a 3D mode, the 2D/3D switchable stereoscopic display of the exemplary embodiment can provide a more perfect stereoscopic image than the related art 2D/3D switchable stereoscopic display.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A stereoscopic display for switching between a two-dimensional (2D) image and a three-dimensional (3D) image, the stereoscopic display comprising:

a display device which displays an image; and a parallax barrier unit which substantially transmits incident light in a 2D mode, and forms barriers to substantially separate an image for a left eye from an image for a right eye in a 3D mode, wherein the parallax barrier unit comprises:

a first polarization plate which transmits light with a first polarization direction;

a first polarization grating screen including a plurality of first birefringence elements that each rotate a polarization direction of light transmitted by the first polarization plate by a predetermined angle in a first direction and a plurality of second birefringence elements that each rotate the polarization direction of light transmitted by the first polarization plate by the predetermined angle in a second direction substantially opposite to the first direction, wherein the first birefringence elements and the second birefringence elements are arranged in a matrix array such that the first and second birefringence elements form parallel columns of alternating birefringence elements and parallel rows of alternating birefringence elements;

a second polarization grating screen which faces the first polarization grating screen and includes a plurality of third birefringence elements that each rotate a polarization direction of light transmitted by the first polarization grating screen by the predetermined angle in the first direction and a plurality of fourth birefringence elements that each rotate the polarization direction of light transmitted by the first polarization grating screen by the predetermined angle in the second direction substantially opposite to the first direction, wherein the third birefringence elements and the fourth birefringence elements are arranged in a matrix array such that the third and fourth birefringence elements form parallel columns of alternating birefringence elements and parallel rows of alternating birefringence elements; and a second polarization plate which faces the second polarization grating screen and transmits only light with a second polarization direction of light transmitted by the second polarization grating screen; and wherein at least one of the first polarization grating screen and the second polarization grating screen is movable horizontally and vertically substantially simultaneously such that vertical barriers for the 3D image are formed generating horizontal parallax, and horizontal barriers for the 3D image are formed generating vertical parallax.

2. The stereoscopic display of claim 1,
wherein one of the first plurality of birefringence elements and the second plurality of birefringence elements are rotators rotating incident light by an angle of about 45° and wherein the other one of the first plurality of birefringence elements and the second plurality of birefringence elements are rotators rotating said incident light by an angle of about −45°.

3. The stereoscopic display of claim 2, wherein one of the third plurality of birefringence elements and the fourth plurality of birefringence elements are rotators rotating incident light by an angle of about 45° and wherein the other one of the third plurality of birefringence elements and the fourth plurality of birefringence elements are rotators rotating incident light by an angle of about −45°.

4. The stereoscopic display of claim 1, wherein one of the first plurality of birefringence elements and the second plurality of birefringence elements are retarders phase-delaying incident light by about λ/4 and wherein the other of the first plurality of birefringence elements and the second plurality of birefringence elements are retarders phase-delaying incident light by about −λ/4.

5. The stereoscopic display of claim 4, wherein one of the third plurality of birefringence elements and the fourth plurality of birefringence elements are retarders phase-delaying incident light by about λ/4 and wherein the other of the third plurality of birefringence elements and the fourth plurality of birefringence elements are reta2rders phase-delaying incident light by about −/4.

6. The stereoscopic display of claim 1, wherein the first polarization plate and the second polarization plate have polarization directions substantially parallel or substantially perpendicular to each other.

7. The stereoscopic display of claim 1, wherein the display device includes a plurality of 2D pixels that each emit light independently, and the parallax barrier unit is disposed on a viewing side of the display device.

8. The stereoscopic display of claim 7, wherein the display device is a plasma display panel.

9. The stereoscopic display of claim 1, wherein the display device comprises:
a backlight unit which emits light;
a rear polarization plate;
a liquid crystal display panel which polarizes incident light per pixel and outputs an image; and
a front polarization plate which transmits only light with the first polarization direction of light transmitted by the liquid crystal display panel,
wherein the parallax barrier unit is disposed between the liquid crystal display panel and a viewer, and the front polarization plate of the display device is the first polarization plate of the parallax barrier unit.

10. The stereoscopic display of claim 1, wherein the display device comprises:
a backlight unit which emits light;
a rear polarization plate which transmits only light with the second polarization direction among light emitted by the backlight unit;
a liquid crystal display panel which polarizes incident light per pixel and outputs an image; and
a front polarization plate,
wherein the parallax barrier unit is disposed between the backlight unit and the liquid crystal display panel, and the rear polarization plate of the display device is the second polarization plate of the parallax barrier unit.

* * * * *